United States Patent
Salvador et al.

(10) Patent No.: US 9,385,382 B2
(45) Date of Patent: Jul. 5, 2016

(54) SYSTEMS AND METHODS FOR CONTROLLING CABIN HEATING IN FUEL CELL VEHICLES

(71) Applicant: GM GLOBAL TECHNOLOGY OPERATIONS LLC, Detroit, MI (US)

(72) Inventors: John P. Salvador, Penfield, NY (US); Steven D. Burch, Honeoye Falls, NY (US); John P. Nolan, Rochester, NY (US); Remy Fontaine, Wiesbaden (DE); Bram Peters, Mainz Kostheim (DE); Oliver Maier, Worms (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 524 days.

(21) Appl. No.: 13/914,334

(22) Filed: Jun. 10, 2013

(65) Prior Publication Data
US 2014/0363752 A1 Dec. 11, 2014

(51) Int. Cl.
*H01M 8/04* (2016.01)
*B60H 1/00* (2006.01)
*B60H 1/04* (2006.01)

(52) U.S. Cl.
CPC ....... *H01M 8/04373* (2013.01); *B60H 1/00392* (2013.01); *B60H 1/00878* (2013.01); *B60H 1/04* (2013.01); *H01M 8/04723* (2013.01); *H01M 8/04768* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

| 2001/0018832 | A1 | 9/2001 | Matsunaga et al. | |
| 2012/0129066 | A1* | 5/2012 | Ben-Aicha | F01P 7/165 429/435 |
| 2013/0271074 | A1* | 10/2013 | Federico | G06F 7/00 320/109 |

FOREIGN PATENT DOCUMENTS

| DE | 60300442 | 9/2005 |
| DE | 102010056208 | 6/2012 |

OTHER PUBLICATIONS

Machine translation of DE60300442.
Machine translation of DE102010056208.

* cited by examiner

*Primary Examiner* — Jonathan Crepeau
(74) *Attorney, Agent, or Firm* — Phillips Ryther & Winchester; John P. Davis

(57) ABSTRACT

System and methods for controlling and optimizing coolant system parameters in a fuel cell system to obtain a requested cabin temperature in a fuel cell vehicle are presented. A method for managing a temperature in a vehicle cabin may include receiving an indication relating to a desired vehicle cabin temperature and a plurality of measured operating parameters. Based on the measured operating parameters, a projected output temperature of a cabin heat exchanger may be estimated. A determination may be made that the projected output temperature of the cabin heat exchanger is less than the indication. Based on the determination a fuel cell coolant parameter may be adjusted.

16 Claims, 5 Drawing Sheets

SYSTEMS AND METHODS FOR CONTROLLING CABIN HEATING IN FUEL CELL VEHICLES

TECHNICAL FIELD

This disclosure relates to systems and methods to control cabin heating in fuel cell vehicles. More specifically, but not exclusively, this disclosure relates to systems and methods for optimizing operating temperature and coolant flow rates of a fuel cell system to provide adequate thermal capacity for cabin heating while increasing system efficiency.

BACKGROUND

Passenger vehicles may include fuel cell ("FC") systems to power certain features of a vehicle's electrical and drivetrain systems. For example, a FC system may be utilized in a vehicle to power electric drivetrain components of the vehicle directly (e.g., electric drive motors and the like) and/or via an intermediate battery system. A FC may include a single cell or, alternatively, may include multiple cells arranged in a stack configuration.

During the normal operation of a FC system, waste heat is created as a byproduct of generating electricity. Such waste heat may be utilized by a variety of vehicle systems including, for example, a cabin heating system. However, removing too much heat from the FC system, or excessively increasing temperature setpoints of the FC system to improve thermal quality may negatively influence durability and/or reduce efficiency of the FC system. For example, one way in which operation of a FC system at a higher temperature could impact efficiency and durability includes when the higher temperature causes the FC system humidification level to shift below an optimum value.

SUMMARY

Systems and methods are presented herein for controlling cabin heating in a fuel cell vehicle. In certain embodiments, a method for managing a temperature in a vehicle cabin may include receiving an indication relating to a desired vehicle cabin temperature. A plurality of measured operating parameters relating to a FC system, an associated cooling system, and/or a cabin heating system may be received. In certain embodiments, the measured operating parameters may include at least one parameter associated with a cabin heat exchanger. In yet further embodiments, the measured operating parameters may include at least one of an air inlet temperature of the cabin heat exchanger, an air flow of the cabin heat exchanger, a flow rate of a coolant in a FC coolant system of the vehicle, and a temperature of a coolant provided to the cabin heat exchanger.

A projected output temperature of the cabin heat exchanger may be estimated based on the measured operating parameters. In certain embodiments, estimating the projected output temperature of the cabin heat exchanger may utilize a number of transfer units (NTU) method. A determination may be made that the projected output temperature of the cabin heat exchanger will be inadequate to meet the indicated heat request. Based on this determination, a FC coolant parameter may be adjusted such that the projected output temperature of the cabin heat exchanger reaches a desired vehicle cabin temperature. In certain embodiments, the FC coolant parameter may include a FC system operating setpoint such as, for example, a FC coolant temperature, a FC coolant flow rate, and/or a FC coolant thermal ramp rate. In some embodiments, adjustments to FC coolant parameters may be prioritized to minimize the impact on durability and efficiency on the FC system by minimizing the frequency of events wherein the FC system operating temperature is increased higher than optimal levels.

In further embodiments, a system may include a FC system and an associated coolant system configured to cool the FC system. A cabin heat exchanger may be included in the coolant system and be configured to exchange heat from the coolant system to air in a vehicle cabin.

A controller coupled to the coolant system and the cabin heat exchanger may perform a variety of functions consistent with the systems and methods disclosed herein. For example, the controller may receive an indication relating to a desired vehicle cabin temperature. Moreover, it may receive an indication from a driver as to whether the vehicle should operate in one or more specified modes (e.g., an efficiency mode, a performance mode, and/or the like). The controller may further receive a plurality of measured operating parameters. The measured operating parameters may include, for example, an air inlet temperature of the cabin heat exchanger, an air flow of the cabin heat exchanger, a flow rate of a coolant in the coolant system, and/or a temperature of a coolant provided to the cabin heat exchanger by the coolant system.

The controller may further estimate a projected output temperature of the cabin heat exchanger based on the measured parameters and determine whether the projected output temperature is less than a requested temperature. If the projected output temperature is less than the requested temperature, the controller may adjust a FC coolant parameter such as, for example, a coolant temperature, a coolant flow rate, and a coolant thermal ramp rate. Adjusting the right combination of FC coolant parameters may result in the projected output temperature being similar to the requested temperature and/or within a particular range of the requested temperature.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

During the normal operation of a FC system, waste heat is created as a byproduct of generating electricity. When a driver of the vehicle requests cabin heating, this waste heat can be used for fulfilling this request. To utilize waste heat produced by the FC system, a cabin heat exchanger may be connected to the coolant system (e.g. in coolant loop) associated with the FC system. While waste heat produced by a FC system can be used to provide cabin heat, providing coolant of a given thermal quality to the cabin heat exchanger may require higher coolant temperatures and/or flow rates which may negatively influence durability and/or reduce efficiency of the system.

Embodiments of the systems and methods disclosed herein may be utilized to determine one or more operating parameters of a FC system that may influence the temperature of a vehicle cabin. In certain embodiments, the systems and methods may utilize cabin heater data (e.g. cabin temperature set point, ambient temperature set point, fan speed, and a cabin heater heat exchanger effectiveness relationship) to alter a FC system temperature set point and coolant flow rate to provide adequate thermal quality for cabin heating.

Figure 1:
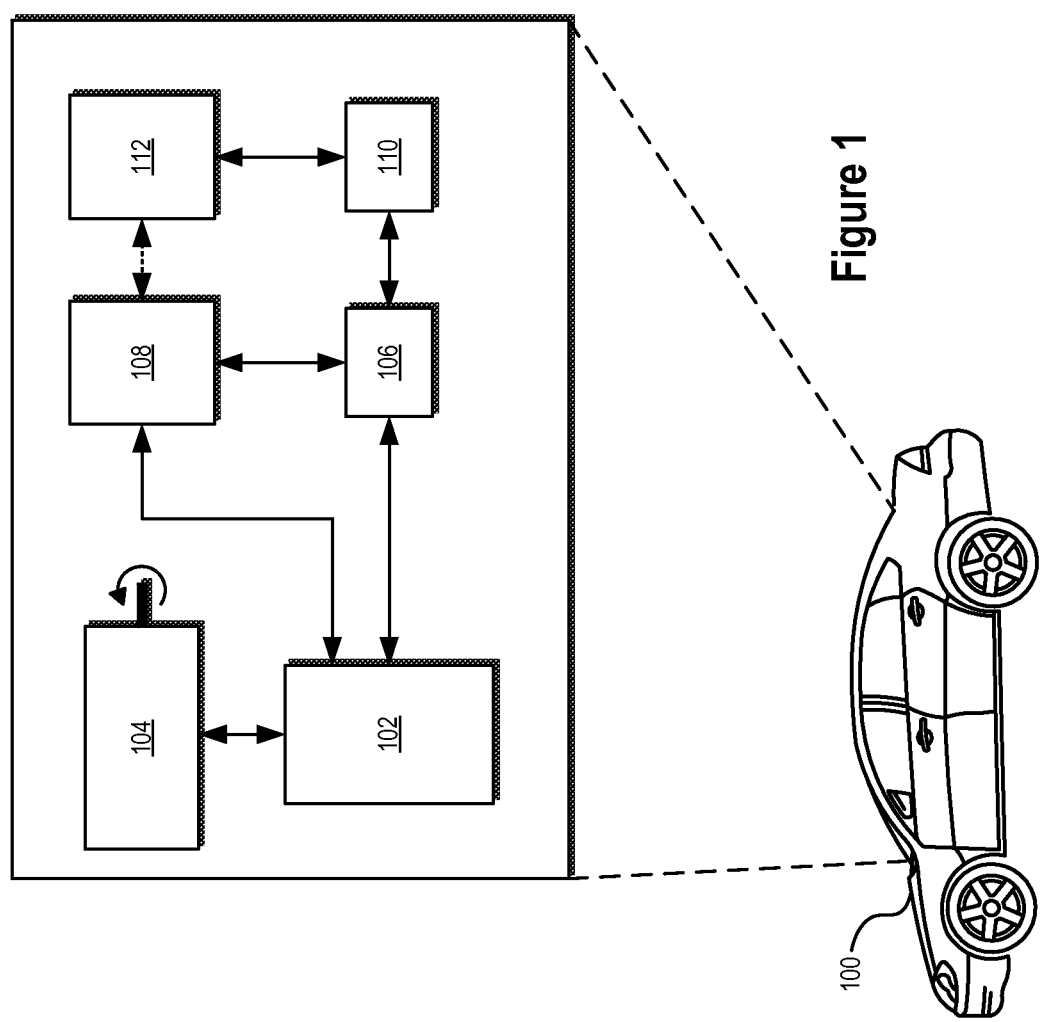
FIG. 1 illustrates an example of a FC system in a vehicle consistent with embodiments disclosed herein.

FIG. 1 illustrates an example of a system for measuring operating parameters of a FC system 102 in a vehicle 100 consistent with embodiments disclosed herein. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, and/or any other type of drivetrain suitable for incorporating the systems and methods disclosed herein. As illustrated, vehicle 100 may include a FC system 102 configured to provide electrical power to certain components of the vehicle 100. For example, FC system 102 may be configured to provide power to electric drivetrain components 104 of the vehicle 100. The FC system 102 may include a single cell or multiple cells arranged in a stack configuration.

As illustrated, the FC system 102 may be configured to directly provide power to electric drivetrain components 104. In further embodiments, the FC system 102 may be configured to provide power to electric drivetrain components 104 via an intermediate battery system (not shown). The battery system may be a high voltage battery system and may utilize any suitable battery technology including, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies. In further embodiments, the FC system 102 may be configured to provide power to one or more other battery systems (not shown) including low voltage battery systems (e.g., lead-acid 12V automotive batteries) that supply electric energy to a variety of vehicle 100 systems including, for example, vehicle starter systems (e.g., a starter motor), lighting systems, audio systems, and/or the like.

The vehicle 100 may include a FC control system 108. The FC control system 108 may be configured to monitor and control certain operations of the FC system 102. In certain embodiments, the FC control system 108 may be utilized to implement, at least in part, the systems and methods disclosed herein. The vehicle 100 may further include a cooling system 106 associated with the FC system 102 configured to perform a variety cooling operations relating to the FC system 102. For example, among other functions, the cooling system 106 may be configured to remove waste heat generated by the FC system 102 during its operation. The FC control system 108 may be configured to monitor and control certain operating parameters of the cooling system 106 including, for example, coolant flow rates and/or coolant temperatures.

The vehicle 100 may further include a cabin heater module 110 that may include a cabin heat exchanger. The cabin heater module 110 may be coupled to the FC cooling system 106 and be configured to utilize heat provided by the FC cooling system 106 to heat the cabin of the vehicle 100. In certain embodiments, the cabin heater module 110 and/or its constituent cabin heat exchanger may be coupled to a coolant loop of the coolant system 106.

A cabin heater control system 112 may be coupled to the cabin heater module 110. The cabin heater control system 112 may be configured to monitor and control certain operations of the cabin heater module 110. In certain embodiments, the cabin heater control system 112 may be utilized to implement, at least in part, the systems and methods disclosed herein. In some embodiments, the cabin heater control system 112 may be configured to monitor and control certain operating parameters of the cabin heater module 110 including, for example, ambient air temperatures, airflow rates, requested cabin temperatures, and/or the like. In certain embodiments, the functionality of the FC control system 108 and/or the cabin heater control system 112 disclosed herein may be implemented in a single system and/or any suitable combination of systems. In yet further embodiments, the FC control system 108 and/or the cabin heater control system 112 may be communicatively coupled with one or more sensors (not shown) associated with the FC system 102, the cooling system 106, and/or the cabin heater module 110 including, for example, air flow sensors, air temperature sensors, coolant temperature sensors, and/or any other suitable sensor or sensors that may provide information utilized in the systems and methods disclosed herein The cooling system 106 and/or the cabin heater module 110 may comprise any suitable number of blowers, pumps, valves, air flaps, circulation paths (e.g., piping), reservoirs, heat exchangers, radiators, electronics (e.g., feedback mechanisms, temperature sensors, thermostats, flow sensors, blower electronics, pressure sensors, and/or the like), and/or any other cooling system and/or heater core component and/or system in any suitable configuration for performing the functions of the cooling system 106 and/or the cabin heater module 110. In certain embodiments, the cooling system 106 may include a coolant pump configured to circulate coolant to remove heat from the FC system 102 and/or a coolant heater configured to change a temperature of coolant in the cooling system 106.

Figure 2:
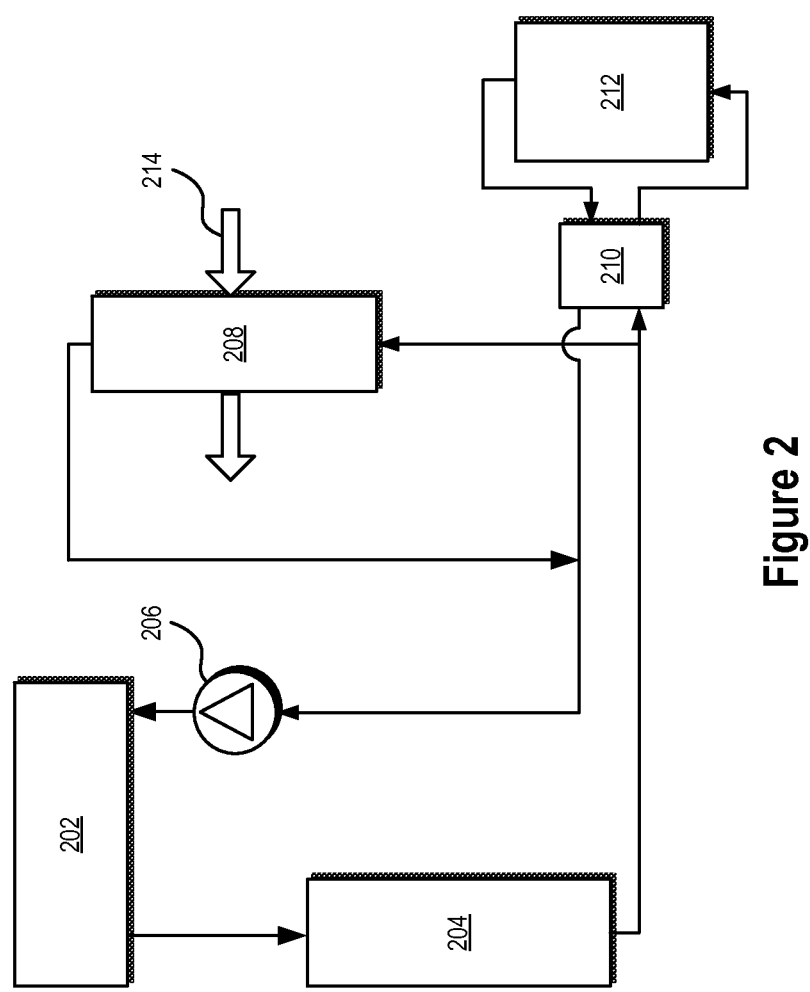
FIG. 2 illustrates an example of a cabin temperature control system consistent with embodiments disclosed herein.

FIG. 2 illustrates an example of a cabin temperature control system consistent with embodiments disclosed herein. As discussed above, during the normal operation of a FC system 202, waste heat may be created as a byproduct of generating electricity. When a driver of a vehicle requests cabin heating, this waste heat can be used for fulfilling this request. To utilize waste heat produced by the FC system 202, a cabin heat exchanger, which may be located within a cabin heater module 208, may be coupled to a FC coolant system (e.g., a coolant loop). The coolant system may include a heater 206 (e.g., an electric heater) configured to add heat to coolant circulating in the FC coolant system. One or more radiators 212 associated with the FC coolant system may further be configured to remove heat from coolant circulating in the FC coolant system.

The FC coolant system may further include one or more mixing valves 210 in the coolant loop configured to raise and/or lower the temperature of the coolant circulating the system (e.g., by varying a mix of coolant heated by the heater 206 and/or cooled by the radiator 212). One or more systems configured to add hydrogen to the reactant air stream provided to the FC system 202 may also be included, enabling the ability to increase the temperature of the FC system 202 by catalytic combustion. In further embodiments, an electric heater may be included in the heater module 208 and/or on either side of the heater core 208. A FC coolant system balance of plant ("BOP") 204 may be included in the FC coolant system comprising any suitable combination of pumps, compressors, valves, fans, lines, piping, reservoirs, and/or other coolant transport components configured to circulate coolant within the coolant system.

In certain embodiments, the cabin heat exchanger of the heater module 208 may be coupled either in series or in parallel with a coolant loop of the FC coolant system. To adequately heat the cabin air, the heat exchanger inside the cabin heater module 208 may need a large enough thermal driving force to adequately heat the cabin air as measured by a cabin temperature sensor (not shown). In the absence of a request for cabin heat, the FC system 202 may be permitted to warm up slowly after the temperature is above a minimum threshold, which may be dictated by ice prevention. When heat is requested for cabin heating, a temperature set point of the coolant system may be raised to ensure that adequate heat is provided to the vehicle cabin. In certain circumstances a coolant flow and a rate of coolant temperature change may also be increased to ensure that adequate heat is provided to the vehicle cabin.

The cooling system may be capable of providing coolant of a given thermal quality to the cabin heater module 208 for heating the vehicle cabin. Higher coolant temperatures, flow rates, rates of heating may result, however, in certain inefficiencies in the coolant system. Systems and methods disclosed herein may allow for optimization of operating temperature and coolant flow rates to provide adequate thermal capacity for cabin heating while increasing system efficiency and/or durability.

Figure 3:
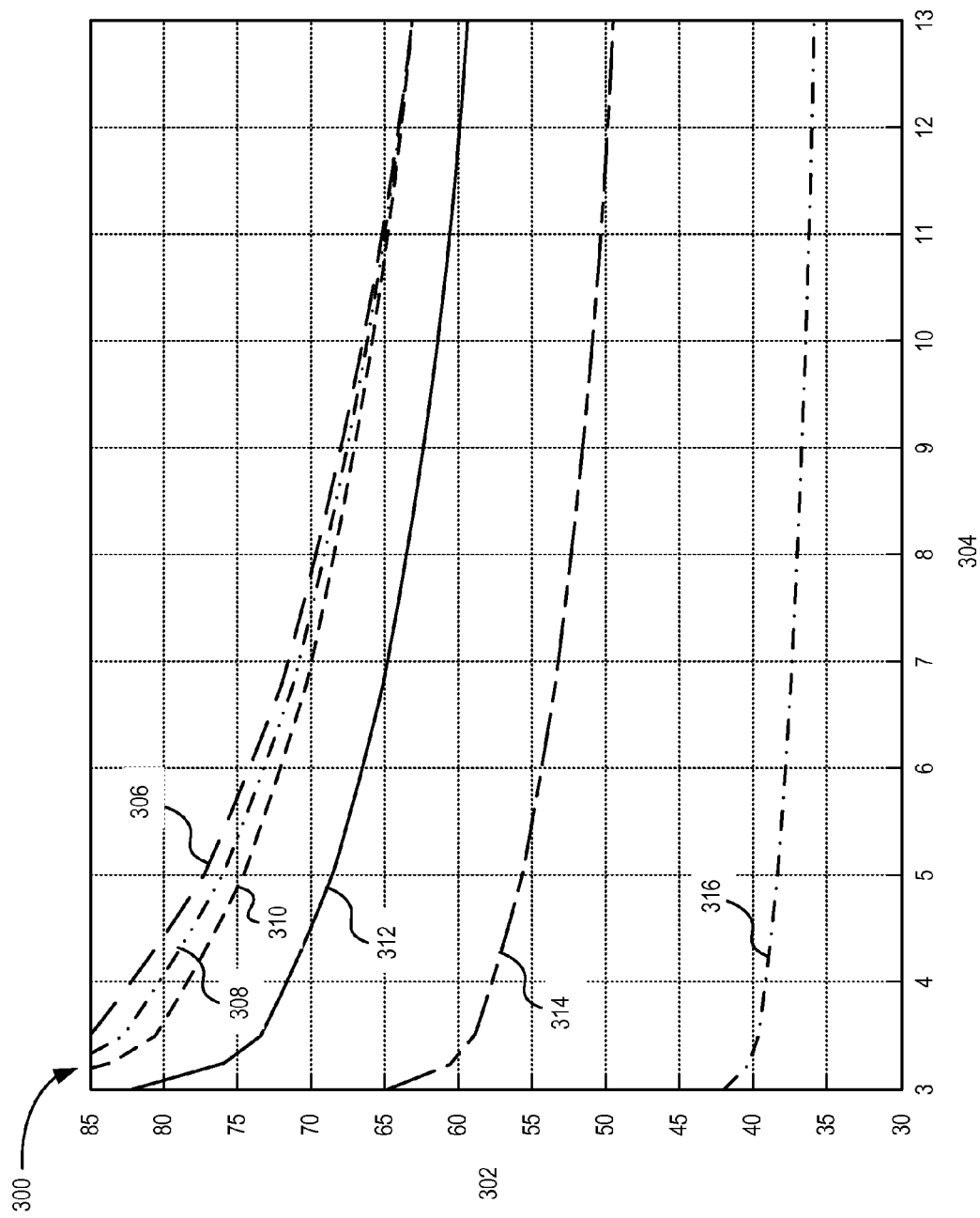
FIG. 3 illustrates a graph of exemplary cabin heat exchanger power isolines consistent with embodiments disclosed herein.

FIG. 3 illustrates a graph 300 of exemplary cabin heat exchanger power isolines 306-316 consistent with embodiments disclosed herein. The graph 300 may illustrate the performance of an exemplary heat exchanger for certain ambient air temperatures, coolant temperatures, coolant flow rates, and a specified air flow rate. Coolant temperature 302 is shown on the y-axis and coolant flow 304 is shown on the x-axis. Each combination of coolant flow and temperature along an isoline represents the same capability to fulfill a heating power request at a specified air flow. Information included in the graph 300 may be used to determine heat exchanger effectiveness from calculations and/or a look-up table for a specific air flow rate and ambient air temperature. For lower flow rates, higher coolant temperatures may be needed to maintain the same heat output from the exchanger and, conversely, lower coolant temperatures can be tolerated with higher coolant flow rates. Higher ambient air temperatures may also translate into less heat required from the heat exchanger. For example, if only a small temperature increase in ambient air is required, the heat made available by isoline 316 might be adequate, while isoline 306 might be utilized on a colder day.

Figure 4:
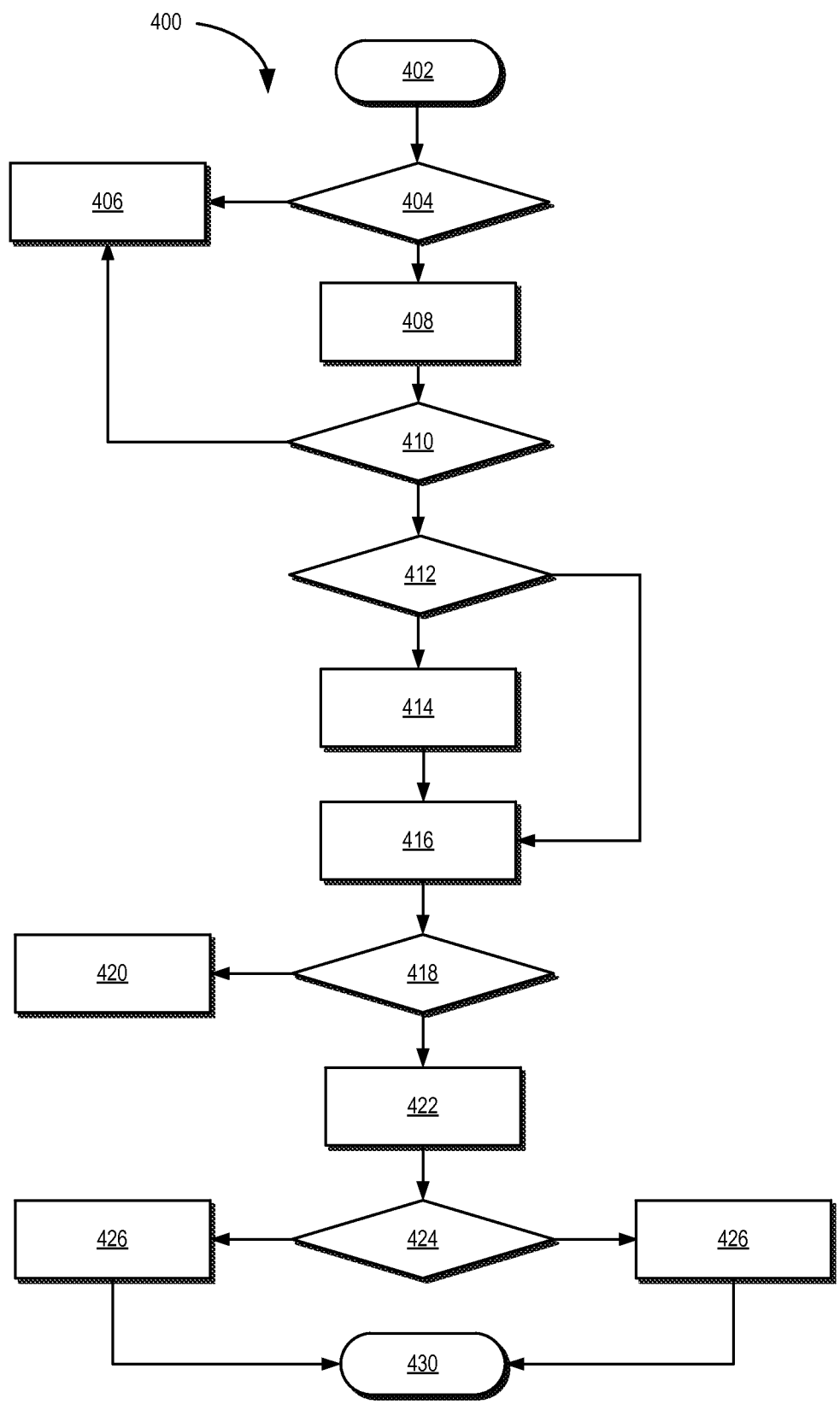
FIG. 4 illustrates a flow chart of an exemplary method for measuring and controlling operating parameters of a FC cabin temperature control system consistent with embodiments disclosed herein.

FIG. 4 illustrates a flow chart of an exemplary method 400 for measuring and controlling operating parameters of a FC cabin temperature control system consistent with embodiments disclosed herein. The illustrated method 400 may be performed using, at least in part, a cabin heater control system, a FC control system, coolant heater, a coolant pump, a cabin heater core, and/or any other suitable system and/or combination of systems.

At 402 the method may initiate. At 404, an indication relating to a desired vehicle cabin temperature may be received. If no heat is requested the set points may not be changed at 406. If heat is being requested, the heat exchanger effectiveness can be calculated and the warmed air temperature can be projected at 408. The heat exchanger effectiveness can be calculated and/or determined using a lookup table at 408 In certain embodiments, heat exchanger effectiveness ($\epsilon$) may be calculated according to Equation 1:

$$\epsilon = f(NTU, C_r) \quad (1)$$

where:

$$NTU = \frac{UA}{C_{min}} \quad (2)$$

Minimum Heat Capacity Rate:

$$C_{min} = MIN(\dot{m}_{air} * C_{p,air}, \dot{m}_{cool} * C_{p,cool}) \quad (3)$$

$$UA = f(\dot{m}_{air}, \dot{m}_{cool}, T_{air,in}, T_{cool,in}) \quad (4)$$

$$C_{p,air} = f(T_{air,in}) \quad (5)$$

$$C_{p,cool} = f(T_{cool,in}) \quad (6)$$

$$C_r = C_{min}/C_{max} \quad (7)$$

Maximum Heat Capacity Rate:

$$C_{max} = MAX(\dot{m}_{air} * C_{p,air}, \dot{m}_{cool} * C_{p,cool}) \quad (8)$$

and $T_{air,in}$ is the air inlet temperature, which may be equal to the ambient air temperature ($T_{amb}$), $\dot{m}_{air}$ is the approximate air flow or fan speed, $\dot{m}_{cool}$ is the approximate coolant mass flow rate, $T_{cool,in}$ is the temperature of the coolant flowing into the heat exchanger, and $T_{air,out}$ is the air temperature at an outlet of the heat exchanger. In certain embodiments, UA may be provided from a heat exchanger manufacturer and/or a lookup table. Further, in some embodiments, $\dot{m}_{air}$ and $\dot{m}_{cool}$ may be estimated through a variety of suitable direct and/or indirect measurements.

For a cross-flow heat exchanger, heat exchanger effectiveness ($\epsilon$) may be calculated according to Equation 9:

$$\epsilon = 1 - \exp((NTU^{0.22})/C_r * \{\exp[-C_r * (NTU)^{0.78}] - 1\}) \quad (9)$$

At 408, the method 400 may further estimate, based on the measured operating parameters, a projected output temperature of a cabin heat exchanger. In certain embodiments, the projected air temperature may be calculated according to Equation 10:

$$T_{air,out} = T_{air,in} + Q/(\dot{m}_{air} * C_{p,air}) \quad (10)$$

where Q represents available heat in the heat exchanger and may be calculated according to Equation 11:

$$Q = \epsilon * \dot{m}_{air} * C_{p,air} * (T_{cool,in} - T_{air,in}) \qquad (11)$$

At 410, a determination may be made whether the projected air temperature is adequate in view of the cabin heat request. If the projected air temperature is adequate, the method 400 may proceed to 406 and the set points of the FC system, the cooling system, and/or the cabin heater core may not be changed. If, however, the method determines that the projected output is less than a cabin heat request indication, the method may proceed to 412 and may adjust a FC coolant parameter.

At 412, a determination may be made whether an air stream thermal capacity of the heater core is less than or greater than a coolant thermal capacity rate. If an air stream thermal capacity is not less than the coolant thermal capacity rate (e.g., $(\dot{m}_{air} * Cp_{air} \geq \dot{m}_{coolant} * Cp_{coolant})$ or $C_{min}/C_{max} > \sim 0.2$), the method may proceed to 414 and the coolant flow rate $\dot{m}_{cool}$ may be increased. If, however, the air stream thermal capacity is sufficiently less than the coolant thermal capacity rate, the method may proceed to 416 where a new projected air temperature is estimated (e.g., estimated based on Equation 10 or the like) if the coolant flow rate was increased at 414.

At 418, a determination may be made whether a desired air temperature set point is greater than projected air temperature. If it is not, the method may proceed to 420 where coolant temperature may not be changed. If, however, it is determined the desired air temperature set point is higher than the projected air temperature (e.g., $T_{air\ out} < T_{air\ out\_desired}$), the coolant temperature set point may be increased at 422.

At 424, a determination may be made whether a desired air temperature is larger than a projected air temperature. If the desired air temperature is larger than the projected air temperature, the coolant temperature ramp rate may be increased at 426 (e.g., using a heater associated with the coolant system and/or the like). In certain embodiments, the ramp rate may also be a function of whether the coolant temperature ramp rate set is below a default ramp rate set point of the FC cooling system. A driver input, such as the selection of an efficiency mode and/or a performance mode, may also influence the ramp rate set point. If the desired air temperature is similar or smaller than the projected air temperature, the coolant temperature ramp rate may not be changed at 428. The method 400 may terminate at 430.

Embodiments of the systems and methods disclosed herein mitigate the potential for a coolant to carry more heat than needed. For example, if an ambient cabin temperature is high and/or an air flow rate is low, the necessary coolant temperature may be relatively low. This may result in the FC system temperature being set independently of cabin heating demands, thus having a smaller impact on FC system durability and/or efficiency.

Figure 5:
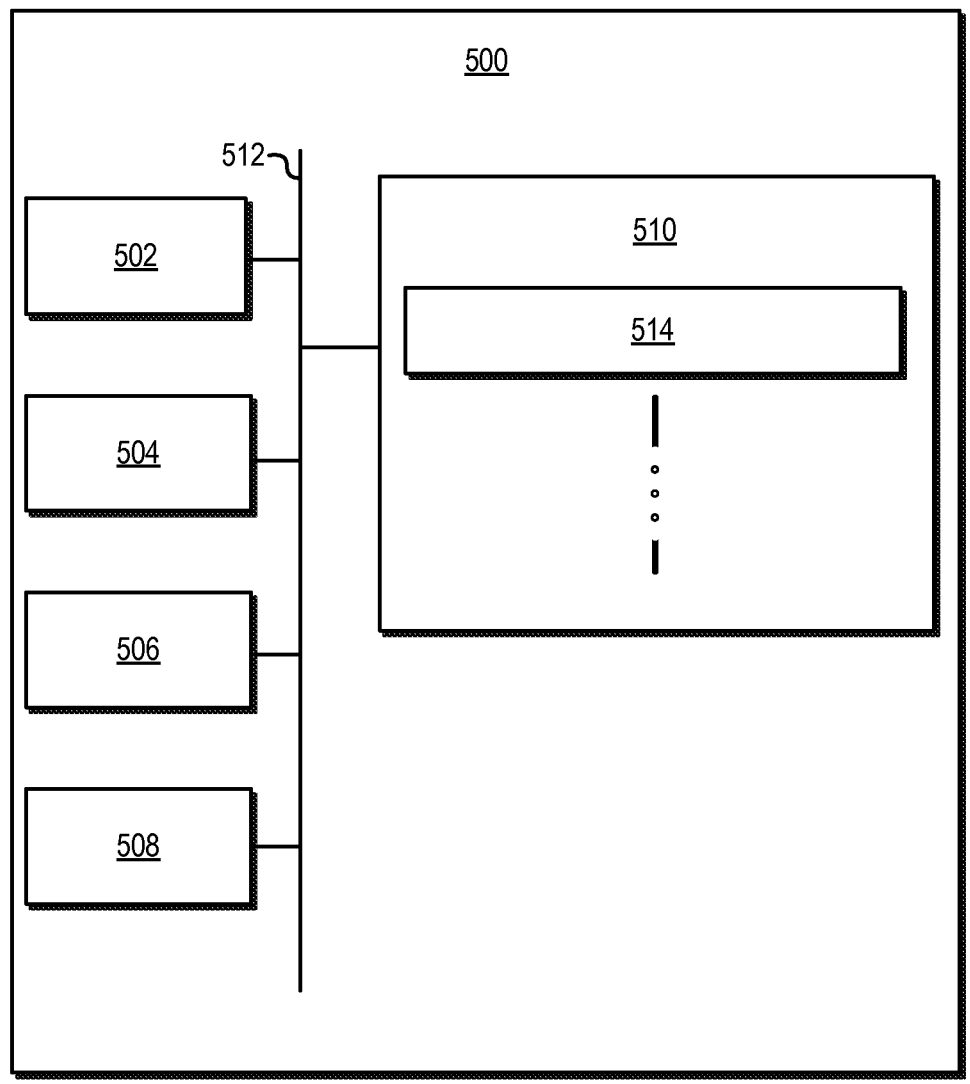
FIG. 5 illustrates a block diagram of a computer system that may be utilized in implementing certain embodiments of the systems and methods disclosed herein.

FIG. 5 illustrates a block diagram of a computer system 500 that may be utilized in implementing certain embodiments of the systems and methods disclosed herein. In certain embodiments, the computer system 500 may be a personal computer system, a server computer system, an on-board vehicle computer, a FC control system, and/or any other type of system suitable for implementing the disclosed systems and methods. In further embodiments, the computer system 500 may be any portable electronic computer system or electronic device including, for example, a notebook computer, a smartphone, and/or a tablet computer.

As illustrated, the computer system 500 may include, among other things, one or more processors 502, random access memory ("RAM") 504, a communications interface 506, a user interface 508, and a non-transitory computer-readable storage medium 510. The processor 502, RAM 504, communications interface 506, user interface 508, and computer-readable storage medium 510 may be communicatively coupled to each other via a common data bus 512. In some embodiments, the various components of the computer system 500 may be implemented using hardware, software, firmware, and/or any combination thereof.

User interface 508 may include any number of devices allowing a user to interact with the computer system 500. For example, user interface 508 may be used to display an interactive interface to a user. The user interface 508 may be a separate interface system communicatively coupled with the computer system 500 or, alternatively, may be an integrated system such as a display interface for a laptop or other similar device. In certain embodiments, the user interface 508 may be produced on a touch screen display. The user interface 508 may also include any number of other input devices including, for example, keyboard, trackball, and/or pointer devices.

The communications interface 506 may be any interface capable of communicating with other computer systems, peripheral devices, and/or other equipment communicatively coupled to computer system 500. For example, the communications interface 506 may allow the computer system 500 to communicate with other computer systems (e.g., computer systems associated with external databases and/or the Internet), allowing for the transfer as well as reception of data from such systems. The communications interface 506 may include, among other things, a modem, a controller area network ("CAN") interface between multiple automotive controllers (e.g., a FC controller and/or an HVAC controller) a satellite data transmission system, an Ethernet card, and/or any other suitable device that enables the computer system 500 to connect to databases and networks, such as LANs, MANs, WANs and the Internet.

Processor 502 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 502 may be configured to execute computer-readable instructions stored on non-transitory computer-readable storage medium 510. Computer-readable storage medium 510 may store other data or information as desired. In some embodiments, the computer-readable instructions may include computer executable functional modules 514. For example, the computer-readable instructions may include one or more functional modules configured to implement all or part of the functionality of the systems and methods described above. Specific functional models that may be stored on computer-readable storage medium 510 include modules configured to perform calculations associated with a heat exchanger and/or a FC cooling system as disclosed herein.

The system and methods described herein may be implemented independent of the programming language used to create the computer-readable instructions and/or any operating system operating on the computer system 500. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 500 may be in response to user commands, results of previous processing, or a request made by another processing machine. It will be appreciated that computer system 500 may utilize any suitable operating system including, for example, Unix, DOS, Android, Symbian, Windows, iOS, OSX, Linux, and/or the like.

Although the foregoing has been described in some detail for purposes of clarity, it will be apparent that certain changes and modifications may be made without departing from the principles thereof. For example, in certain embodiments, the systems and methods disclosed herein may be utilized in connection with FC systems not included in a vehicle. It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A method for managing a temperature in a vehicle cabin while reducing impacts on fuel cell system durability and efficiency, the method comprising:
receiving an indication relating to a desired vehicle cabin temperature;
receiving a plurality of measured operating parameters;
estimating, based on the measured operating parameters, a projected output temperature of a cabin heat exchanger;
determining that the projected output temperature of the cabin heat exchanger is less than the indication; and
adjusting, based on the determination, a fuel cell coolant parameter.

2. The method of claim 1, wherein adjusting the fuel cell coolant parameter comprising adjusting the fuel cell coolant parameter such that the projected output temperature of the cabin heat exchanger reaches the desired vehicle cabin temperature.

3. The method of claim 1, wherein the fuel cell coolant parameter comprises a fuel cell system operating setpoint.

4. The method of claim 1, wherein the fuel cell coolant parameter comprises at least one of a fuel cell coolant temperature, a fuel cell coolant flow rate, and a fuel cell coolant thermal ramp rate.

5. The method of claim 1, wherein the plurality of measured operating parameters comprise at least one parameter associated with the cabin heat exchanger.

6. The method of claim 1, wherein the plurality of measured operating parameters comprise at least one parameter associated with a fuel cell coolant system of the vehicle.

7. The method of claim 1, wherein the plurality of measured operating parameters comprise at least one of an air inlet temperature of the cabin heat exchanger, an air flow of the cabin heat exchanger, an flow rate of a coolant in a fuel cell coolant system of the vehicle, and a temperature of a coolant provided to the cabin heat exchanger.

8. The method of claim 1, wherein estimating the projected output temperature of the cabin heat exchanger comprises estimating the projected output temperature of the cabin heat exchanger using a number of transfer units (NTU) method.

9. A non-transitory computer-readable storage medium storing instructions that, when executed by a processor, cause the processor to:
receive an indication relating to a desired vehicle cabin temperature;
receive a plurality of measured operating parameters;
estimate, based on the measured operating parameters, a projected output temperature of a cabin heat exchanger;
determine that the projected output temperature of the cabin heat exchanger is less than the indication; and
adjust, based on the determination, a fuel cell coolant parameter.

10. The non-transitory computer-readable storage medium of claim 9, wherein adjusting the fuel cell coolant parameter comprising adjusting the fuel cell coolant parameter such that the projected output temperature of the cabin heat exchanger reaches the desired vehicle cabin temperature.

11. The non-transitory computer-readable storage medium of claim 9, wherein the fuel cell coolant parameter comprises a fuel cell system operating setpoint.

12. The non-transitory computer-readable storage medium of claim 9, wherein the fuel cell coolant parameter comprises at least one of a fuel cell coolant temperature, a fuel cell coolant flow rate, and a fuel cell coolant thermal ramp rate.

13. The non-transitory computer-readable storage medium of claim 9, wherein the plurality of measured operating parameters comprise at least one parameter associated with the cabin heat exchanger.

14. The non-transitory computer-readable storage medium of claim 9, wherein the plurality of measured operating parameters comprise at least one parameter associated with a fuel cell coolant system of the vehicle.

15. The non-transitory computer-readable storage medium of claim 9, wherein the plurality of measured operating parameters comprise at least one of an air inlet temperature of the cabin heat exchanger, an air flow of the cabin heat exchanger, a flow rate of a coolant in a fuel cell coolant system of the vehicle, and a temperature of a coolant provided to the cabin heat exchanger.

16. The non-transitory computer-readable storage medium of claim 9, wherein estimating the projected output temperature of the cabin heat exchanger comprises estimating the projected output temperature of the cabin heat exchanger using a number of transfer units (NTU) method.

* * * * *